No. 847,970. PATENTED MAR. 19, 1907.
J. M. REBHOLZ.
VEHICLE TOP.
APPLICATION FILED JAN. 18, 1907.
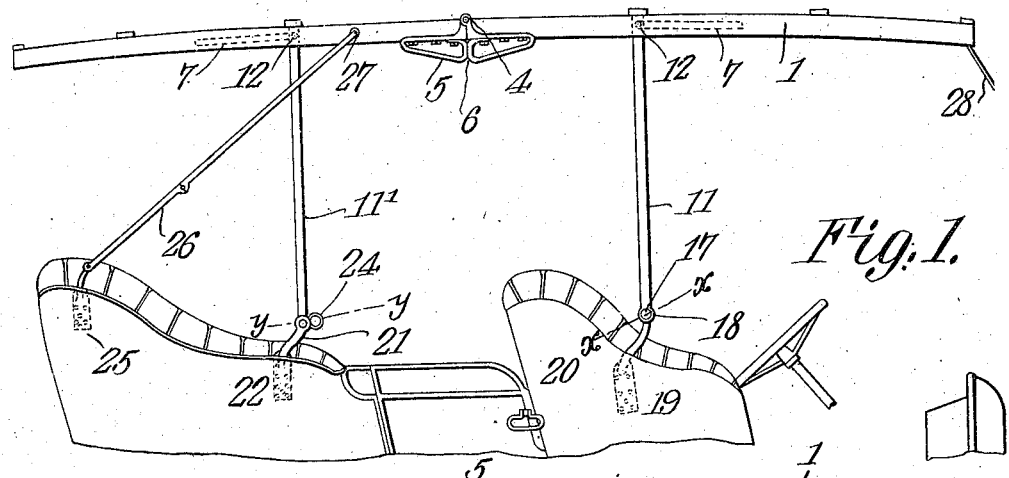
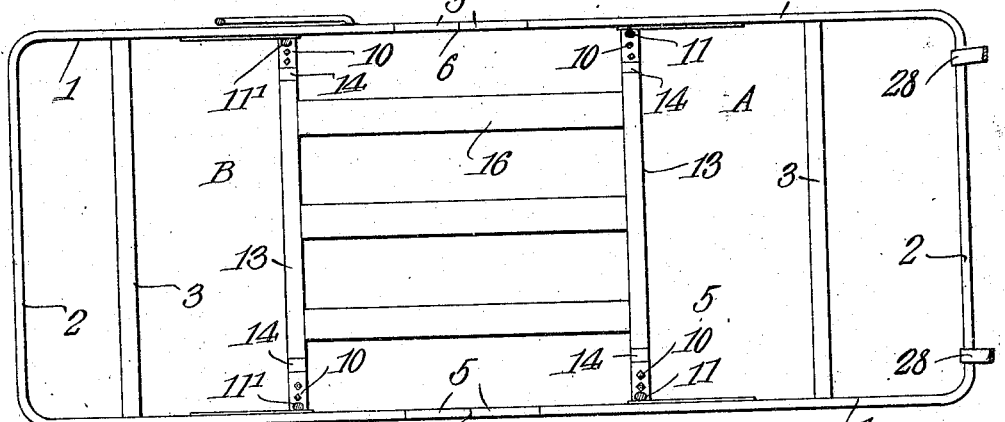
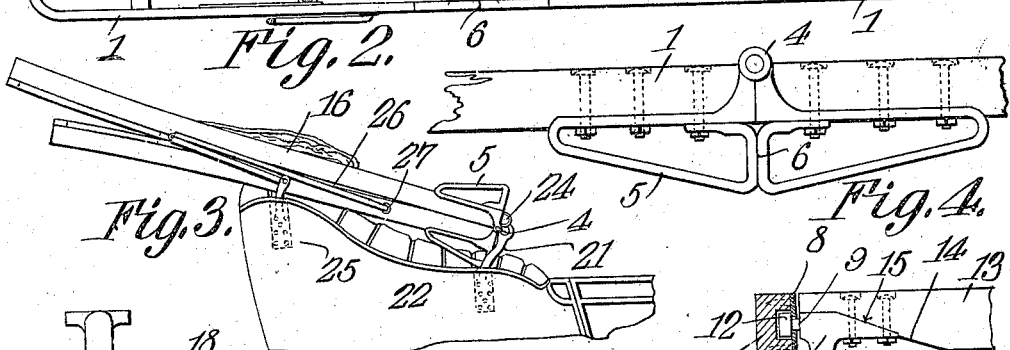
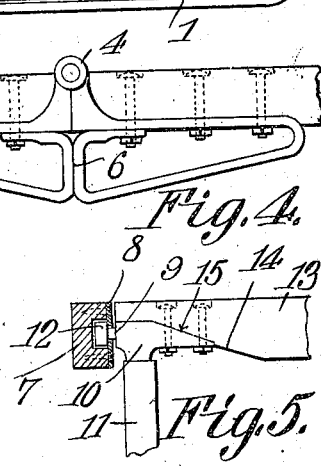
WITNESSES:  Joseph M. Rebholz, INVENTOR.
By C. A. Snow & Co.
ATTORNEYS

UNITED STATES PATENT OFFICE.

JOSEPH MARY REBHOLZ, OF TROY, OHIO.

VEHICLE-TOP.

No. 847,970.  Specification of Letters Patent.  Patented March 19, 1907.

Application filed January 18, 1907. Serial No. 352,966.

*To all whom it may concern:*

Be it known that I, JOSEPH MARY REBHOLZ, a citizen of the United States, residing at Troy, in the county of Miami and State of Ohio, have invented a new and useful Vehicle-Top, of which the following is a specification.

This invention relates to vehicle-tops, and is more particularly designed for use upon automobiles.

The object of the invention is to provide a top which can be rigidly supported over a two-seated vehicle and which can be readily folded when not in use, so as to assume a position upon the rear portion of the vehicle.

With these and other objects in view the invention consists of certain novel features of construction and combinations of parts, which will be hereinafter more fully described, and pointed out in the claims.

In the accompanying drawings is shown the preferred form of the invention.

In said drawings, Figure 1 is a side elevation of a portion of an automobile, the same being provided with a top constructed in accordance with the present invention. Fig. 2 is a bottom plan view of the top, the supports being shown in section. Fig. 3 is a side elevation of a portion of the automobile and showing the top folded. Fig. 4 is an enlarged side elevation showing the adjoining ends of one side of the top. Fig. 5 is a transverse section through one of said sides and showing the connection between one of the supports and the top. Fig. 6 is an enlarged section on line $x\ x$, Fig. 1; and Fig. 7 is an enlarged section on line $y\ y$, Fig. 1.

Referring to the figures by characters of reference, A and B are similar front and rear sections of the vehicle-top, each section being made up of side strips 1 and an end strip 2, said side strips being connected by cross-strips 3. The side strips of the two sections A and B are connected by means of hinges 4, the leaves of said hinges being provided with inturned portions 5, which constitute abutments 6, adapted when the top is unfolded to contact, as shown in Figs. 1 and 4. These leaves are bolted or otherwise fastened to the side strips of the top sections. Each of the side strips has a groove 7 extending longitudinally within its inner face and adjacent the central portion thereof, and each of these grooves is partly covered by a longitudinally-slotted face-plate 8. Slidably mounted within each of the slotted plates 8 is a trunnion 9, extending laterally from a head 10, disposed at the upper end of a standard or support 11, and this trunnion has an enlarged end 12, whereby withdrawal of the trunnion from the face-plate is prevented. Two of the heads 10 are connected to the side strips of each section A and B, said heads being rigidly fastened together by a cross-strip 13. The end portions of the cross-strip are reduced, as shown at 14, so as to bear upon and be fastened firmly to the beveled faces 15 of the heads 10. The cross-strips 13 of the two sections A and B are connected by flexible straps 16, which extend longitudinally of the top.

The standards 11 of the front section A have inwardly-extending lugs 17 at their lower ends adapted to be sprung into apertures 18, formed within brackets 19, which are preferably fastened to the outer sides of the front seat 20 of the vehicle. Brackets 21 are also preferably secured to the outer sides of the rear seat 22 of the vehicle. These rear brackets 21 have pivot-bolts 23 secured therein and on which are pivotally mounted the rear standards 11', which are similar in every respect to the standards 11, with the exception that the same are provided with forwardly-projecting eyes 24, for the purpose hereinafter set forth. A bracket 25 is also preferably secured to the outer face of each side of the rear seat 22 and has pivotally connected to it the lower end of a brace 26, made up of pivotally connected sections, the upper end of the upper section being pivoted to the rear member B of the top, as shown at 27. The two sections of the brace are connected by a knuckle-joint, so that when the brace is extended the same will rigidly hold the top against oscillation. One or more cords 28 are to be used for connecting the front of the top to the front portion of the body of the vehicle.

When the parts are in the position shown in Fig. 1 and it is desired to lower the top, the cords 28 are unfastened and the braces 26 are folded upon themselves. The adjoining ends of the top sections A and B are then pulled downward, so that said sections will fold upon each other, after which the front supports 11 are removed from engagement with the brackets 19, so that the two top sections can be folded together and then swung backward onto the rear seat, as shown in Fig. 3. The front standards 11 are adapted to be sprung into engagement with the eyes 24 when the parts are in folded position. When it is desired to set up the top, the operation above described is reversed. This top is very rigid and can be constructed to fit any length of vehicle.

What is claimed is—

1. The combination with a vehicle having front and rear brackets thereon; of a top consisting of hingedly-connected sections, front and rear supports slidably and pivotally connected to said sections, the rear supports being pivotally connected to the rear brackets and the front supports detachably connected to the front brackets, said rear supports having eyes to detachably engage the front supports when detached from their brackets, and a brace for connecting the vehicle and its top.

2. The combination with a vehicle having front and rear brackets; of rear supports pivotally connected to the rear brackets and having integral projections adjacent said brackets, supports pivotally and detachably connected to the front brackets, a top made up of sections hinged together, said sections being pivotally and slidably engaged by the front and rear supports respectively, said front supports being adapted when the top is folded to engage the projections on the rear supports, and means for bracing the top when in raised position.

3. The combination with a vehicle having front and rear brackets thereon; of rear supports pivotally connected to the rear brackets and having projections adjacent their brackets, front supports pivotally and detachably connected to the front brackets, a foldable top having its respective sections pivotally and slidably mounted upon the front and rear supports, said front supports adapted to engage projections on the rear supports when the top is folded, and a foldable brace pivotally connected to the top and to the vehicle.

4. A top for vehicles comprising rigid sections hinged together and having longitudinal grooves in their inner faces, a cross-strip within each section, flexible connections between the cross-strips of the two sections, means secured to each cross-strip for riding within the grooves, front and rear supports rigidly connected to the cross-strips, rear brackets pivotally connected to the rear supports, and front brackets pivotally connected to the front supports, said front supports being detachable from their brackets and movable into engagement with the rear supports when the top is folded.

5. A top for vehicles comprising rigid sections hinged together and having longitudinal grooves in their inner faces, a cross-strip within each section, flexible connections between the cross-strips of the two sections, means secured to each cross-strip for riding within the grooves, front and rear supports rigidly connected to the cross-strips, rear brackets pivotally connected to the rear supports, front brackets pivotally connected to the front supports, said front supports being detachable from their brackets and movable into engagement with the rear supports when the top is folded, and means for bracing the top when the same is raised.

6. A top for vehicles comprising oppositely-disposed similar sections, hinges connecting the same and having integral abutments, each of said sections having longitudinal grooves therein, a cross-strip within each section, flexible connections between said cross-strips, supports secured to the ends of the cross-strips, means carried thereby and pivotally and slidably mounted within the grooves, brackets adapted to be pivotally engaged by the rear supports, brackets adapted to be detachably and pivotally engaged by the front supports, means upon the rear supports adapted to be engaged by the front supports when the top is folded, and means for bracing the top when in raised position.

In testimony that I claim the foregoing as my own I have hereto affixed my signature in the presence of two witnesses.

JOSEPH MARY REBHOLZ.

Witnesses:
B. J. JOHNSON,
J. H. LANDIS.